United States Patent [19]

Ibenthal

[11] Patent Number: 5,493,589
[45] Date of Patent: Feb. 20, 1996

[54] CIRCUIT ARRANGEMENT FOR SYNCHRONIZING A DATA STREAM

[75] Inventor: Achim Ibenthal, Elmshorn, Germany

[73] Assignee: U.S. Philips Corporation, New York, N.Y.

[21] Appl. No.: 273,533

[22] Filed: Jul. 11, 1994

[30] Foreign Application Priority Data

Jul. 27, 1993 [DE] Germany .................. 43 25 107.2

[51] Int. Cl.⁶ .................................................. H04L 7/04
[52] U.S. Cl. ......................................... 375/372; 370/102
[58] Field of Search ................................ 375/371, 372; 370/102; 348/540, 547

[56] References Cited

U.S. PATENT DOCUMENTS

| 4,941,156 | 7/1990 | Stern et al. | 375/372 |
| 5,263,056 | 11/1993 | Urbansky | 375/372 |

FOREIGN PATENT DOCUMENTS 0080712  6/1989  European Pat. Off. .

OTHER PUBLICATIONS

B. Morgenstern, "Technik der magnetischen Videosignalaufzeichnung", Teubner Verlag 1985, Section 5.5.4.4., pp. 111–113.

*Primary Examiner*—Young T. Tse
*Attorney, Agent, or Firm*—Bernard Franzblau

[57] ABSTRACT

A circuit for converting samples of data received at a high sampling rate into data samples at a low sampling rate integrally related to the high sampling rate and with the low rate samples synchronized with the high rate samples without a complex phase control apparatus. A memory stores and transfers data under control of write and read address signals. The read address signals are derived by combining the write address signals with a difference address signal generated by a circuit including a modulo counter with a modulus corresponding to the integral ratio between the high and low sampling rates, a first sample-and-hold circuit for storing the count of the modulo counter and supplying its count to an allocating circuit which generates the difference address signal and supplies same to a combining circuit. A decoder controlled by the modulo counter supplies a clock signal at the low sampling rate to a second sample-and-hold circuit fed with data from the memory. The second sample-and-hold circuit outputs synchronized data at the low sampling rate.

8 Claims, 2 Drawing Sheets

| PHI | DEL |
|---|---|
| 0 | 4 |
| 1 | 3 |
| 2 | 2 |
| 3 | 1 |
FIG. 2
| PHI | 0 | 1 | 2 | 3 | 0 | 1 | 2 | 3 | 0 | 1 | 2 | 3 | 0 | 1 | 2 | 3 |
|---|---|---|---|---|---|---|---|---|---|---|---|---|---|---|---|---|
| SM | 0 | 0 | 0 | 0 | //1// | 0 | 0 | 0 | 0 | 0 | 0 | 0 | 0 | 0 | 0 | 0 |
| DM | x | x | x | x | 1 | 2 | 3 | 4 | 5 | 6 | 7 | 8 | 9 | 10 | 11 | 12 |
| DL | x | x | x | x | x | x | x | x | 1 | 2 | 3 | 4 | 5 | 6 | 7 | 8 |
| SL | 0 | 0 | 0 | 0 | 0 | 0 | 0 | 0 | //1// | 0 | 0 | 0 | 0 | 0 | 0 | 0 |
| DN | x | | | | x | | | | 1 | | | | 5 | | | |
| SN | 0 | | | | 0 | | | | //1// | | | | 0 | | | |
FIG. 3
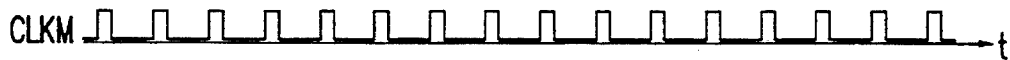
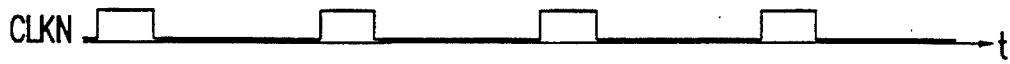
| PHI | 0 | 1 | 2 | 3 | 0 | 1 | 2 | 3 | 0 | 1 | 2 | 3 | 0 | 1 | 2 | 3 |
|---|---|---|---|---|---|---|---|---|---|---|---|---|---|---|---|---|
| SM | 0 | //1// | 0 | 0 | 0 | 0 | 0 | 0 | 0 | 0 | 0 | 0 | 0 | 0 | 0 | 0 |
| DM | x | 1 | 2 | 3 | 4 | 5 | 6 | 7 | 8 | 9 | 10 | 11 | 12 | 13 | 14 | 15 |
| DL | x | x | x | x | 1 | 2 | 3 | 4 | 5 | 6 | 7 | 8 | 9 | 10 | 11 | 12 |
| SL | 0 | 0 | 0 | 0 | //1// | 0 | 0 | 0 | 1 | 0 | 0 | 0 | 0 | 0 | 0 | 0 |
| DN | x | | | | 1 | | | | 5 | | | | 9 | | | |
| SN | 0 | | | | //1// | | | | 0 | | | | 0 | | | |
FIG. 4

CIRCUIT ARRANGEMENT FOR SYNCHRONIZING A DATA STREAM

BACKGROUND OF THE INVENTION

1. Field of the Invention

This invention relates to a circuit arrangement for synchronizing the successive, low sampling rate samples of a data stream converted from a high rate to the low sampling rate and represented as a sequence of samples of a signal with a first synchronizing signal contained in the high sampling rate data stream. Such a synchronizing circuit comprises memory which can be cyclically written and read in an equidirectional address sequence. The memory can receive write address signals for writing the samples of the high sampling rate data stream from a write address counter which counts periods of a first sampling clock signal having the high sampling rate, and read address signals for reading the samples of the equally high sampling rate data stream from a combination circuit in which the read address signals can be generated from an additive combination of the write address signals with a difference address signal. The circuit also includes an arrangement for forming the difference address signal.

2. Description of the Related Art

A circuit arrangement in which a digital television signal present as a sequence of samples at a first sampling frequency can be converted into a sequence of samples at a second sampling frequency is known from EP-PS 0 080 712. This document proposes measures for obtaining the samples of an output signal by interpolation of the samples of an input signal. This document does not give any indication about synchronization of the samples of the output signal by means of a predetermined synchronizing signal.

Synchronization of the samples is necessary, particularly with a conversion of time-discrete television signals, i.e. signals which are present as a sequence of samples having a given sampling rate and constitute a data stream, into another sampling rate. Such a synchronization may also be important for signals other than the aforesaid television signals. A particular application is a conversion from a high to a low sampling rate. For example, in horizontally coupled television systems, it should be ensured that the reference for the start of the picture in each line is at a predetermined position independent of the sampling rate.

It is feasible to align the start of the picture in each line at the predetermined position by means of an analog or digital phase control of the sampling clock, particularly the clock having the low sampling rate, in dependence upon a horizontal synchronizing signal. However, this is very elaborate and does not lead to the envisaged object in many cases.

A circuit arrangement for digital, line-frequency coarse correction of time base errors upon playback of a video recording on a video recorder and upon display of this video recording on a display screen is known from the monograph by B Morgenstern, "Technik der magnetischen Videosignalaufzeichnung", Teubner Verlag 1985, section 5.5.4.4, pp. 111 to 113. This arrangement comprises a random access memory in which consecutive data words consisting of data of three pixels each are written. This memory is organized in such a way that the values of the pixels are cyclically written from the tape with an increasing address sequence. The time error correction is achieved in that the time base error is converted into an address difference. After a pixel has been written into the memory, another pixel is immediately read whose address results from that of the pixel which has just been written into the memory and has been changed by the address difference, the address difference or the difference address being determined by a time error detector. The write address sequence is generated by a write address counter which is cyclically clocked at a third of the sampling frequency. The time error detector, which receives the horizontal synchronizing signal from the tape and a horizontal synchronizing reference, determines the time error as a number of periods of the clock frequency of the write address counter and converts it into the address difference which is processed, during writing, in a subtracter stage.

The description of this circuit arrangement does not give any indication about synchronization at a sampling rate conversion.

SUMMARY OF THE INVENTION

It is an object of the invention to provide a circuit arrangement of the kind described for synchronizing a data stream, which provides versatility of use and the possibility of a simple synchronization at a sampling rate conversion.

According to the invention, this object is achieved in that the arrangement for forming the difference address signal comprises a modulo counter for counting the periods of the first sampling clock signal, a first sample-and-hold circuit for storing the count of the modulo counter upon the occurrence of the first synchronizing signal and an allocating circuit which can receive the count stored in the first sample-and-hold circuit and supply a value of the difference address signal at each of these counts, at which value the write address counter has a larger modulus than the module counter and the modulus of the modulo counter corresponds to the integral ratio between the high and the low sampling rates, in that a decoding circuit is provided for supplying a second sampling clock signal having the low sampling rate whenever the modulo counter assumes a basic state, and in that a second sample-and-hold circuit is provided for storing a sample which is read from the memory by means of the read address signal at the instant of occurrence of the second sampling clock signal and for supplying the samples thus stored as the data stream converted to the low sampling rate.

The invention makes possible the synchronization of the sampling clock at the low sampling rate without any elaborate phase control. It is particularly suitable for use in sub-sampling time-discrete data of a high sampling rate data stream for gaining a low sampling rate data stream to restore a fixed phase relation with a reference signal without discontinuities occurring in the data stream. This is particularly advantageous if the data stream is to be subjected to a recursive filtering operation. It is fundamentally possible to synchronize the modulo counter with a second synchronizing signal, i.e. the counter is resettable to a basic state by this second synchronizing signal. However, this leads to the above-mentioned discontinuities in the data stream, which discontinuities, when recursively filtered, lead to errors. Particularly when signal processors are used for realizing the recursive filtering operation, these errors become manifest as discontinuities in the program run, with the result that either recursive components are not reset upon synchronization, or that false recursive components are used in the further course of the signal processing operation and thus have an erroneous influence. To avoid such a recursive delay of false signal components in the further signal processing operation, a very elaborate signal processing program should be carried out so as to reset internal pipeline structures, which, moreover, would require a time-consuming signal processing operation. If the circuit arrangement according to the invention is used, it is optionally unnecessary to reset such a modulo counter so that said errors will not occur in the recursive filtering operation. The circuit arrangement according to the invention can be advantageously used in corresponding signal processing systems in which recursive computing procedures for signal processing are carried out.

Advantageously, the samples within the data stream comprise an information signal component and a synchronizing signal component associated with the first synchronizing signal. This provides a simple possibility of transmitting the synchronizing information with the low sampling rate data stream in which it can be made available, for example, for control purposes.

The circuit arrangement according to the invention is preferably applicable to time-discrete television signals in which the data stream is represented as a sequence of samples of a television signal. The particular object of the invention is to convert the sampling rate of an incoming television signal and, moreover, to adapt its horizontal phase position to a second television signal. In fact, if the incoming television signal ("sub-channel") and the second television signal ("main channel") have more or less different horizontal frequencies, line-to-line phase shifts occur which are compensated by the invention.

Advantageously, the circuit arrangement according to the invention can also be used for a low sampling rate sub-sampling of a high sampling rate data stream. This use is particularly recommendable for the "oversampling" method in which a subsequent sub-sampling operation is performed.

The circuit arrangement according to the invention may preferably also be used in an arrangement for picture format conversion as used, for example, for the "picture-in-picture" function. In this function, a small picture is "inserted" from the sub-channel into the picture of the main channel so that the system clock is also derived from the main channel for the display of the inserted picture. For the purpose of vertical picture adaptation after sub-sampling, a diminution factor is buffered in the sub-channel. To avoid torn edges in the inserted picture, the starts of the lines of the sub-sampled picture from the sub-channel should be in a fixed phase relation with the horizontal synchronizing signal of the sub-channel. This is ensured in a simple manner by the invention.

These and other aspects of the invention will be apparent from and will be elucidated with reference to the drawings described hereinafter.

BRIEF DESCRIPTION OF THE DRAWINGS

In the drawings:

FIG. 2 shows a Table to explain the operation of an allocating circuit for the arrangement of FIG. 1;

FIG. 3 shows a signal diagram for a first mode of operation; and

FIG. 4 shows a signal diagram for a second mode of operation of the circuit arrangement of FIG. 1.

DESCRIPTION OF THE PREFERRED EMBODIMENT

Figure 1:
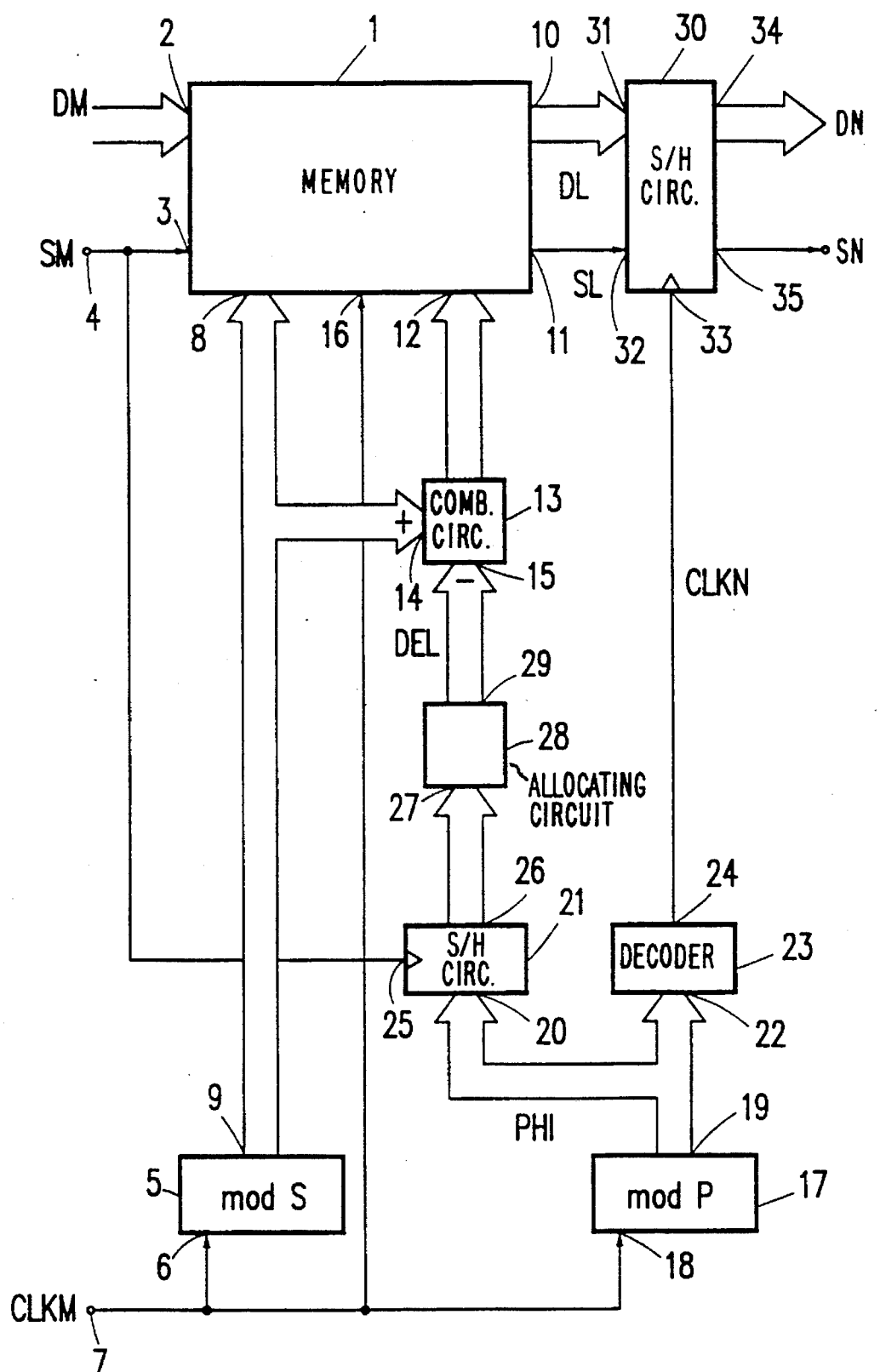
FIG. 1 shows the block diagram of a circuit arrangement according to the invention.

The embodiment of the circuit arrangement according to the invention for synchronizing a data stream in accordance with FIG. 1 includes a ring memory 1 which can be cyclically written and read in an equidirectional address sequence. The successive, high sampling rate samples of the information signal component DM of a data stream are applied to a first data input 2 of the ring memory 1. The information signal component DM represents, for example, a television signal. The data stream further comprises a synchronizing signal component i.e., a first synchronizing signal SM which is applied from a terminal 4 to the ring memory 1 via a second data input 3. Preferably, time-allocated samples of the information signal component DM and the first synchronizing signal SM from the data stream are stored as a common data word in the ring memory 1.

The circuit arrangement of FIG. 1 also comprises a write address counter 5 which counts modulo-S, with the modulus S of the write address counter 5 being larger than the integral ratio between the high and the low sampling rate of the data stream, which will be elucidated hereinafter. A clock input 6 of the write address counter 5 receives, via a terminal 7, a first sampling clock signal CLKM whose frequency corresponds to the high sampling rate of the data stream at which the signal for gaining the high sampling rate sample has been sampled. The ring memory 1 is adapted to store at least S data words of the data stream. The individual memory locations for writing the samples applied to the data inputs 2 and 3 are selected via write address signals which are applied to a write address signal input 8 of the ring memory 1. The write address signals are generated by the write address counter 5 and are supplied from its output 9.

The samples stored in the ring memory 1 can be read from this memory with a predeterminable delay. To this end, a first data output 10 is used at which the information signal component DL of the data stream is supplied with an equally high sampling rate of the first sampling clock signal CLKM as at the first data input 2 but, with respect thereto, delayed by an adjustable number of periods of the first sampling clock signal CLKM. With the same delay, a synchronizing signal SL, which further corresponds to the first synchronizing signal SM, is supplied at a second data output 11. For reading the samples of the data stream via the first and the second data output 10, 11, a read address signal input 12 of the ring memory 1 receives a corresponding read address signal.

To adjust the delay between the instants of writing and reading the samples, the circuit arrangement of FIG. 1 further includes a combination circuit 13 in the form of, for example, a subtracter. The write address signal from the output 9 of the write address counter 5 is applied to a first input 14 of this subtracter and a difference address signal is applied to a second input 15. Write address signals and difference address signals are additively combined in the combination circuit 13, which additive combination should notionally also imply a subtraction of said signals, while taking their signs into account.

To realize the write and read operations, the first sampling clock signal CLKM is applied from terminal 7 to a clock signal input 16 of the ring memory 1. During each period of the first sampling clock signal CLKM there is both a write operation and a read operation.

To form the difference address signal, which is applied to the second input 15 of the combination circuit 13, the embodiment of the circuit arrangement of FIG. 1 further includes a modulo counter 17 which has a modulus P corresponding to the integral ratio between the high and the low sampling rates of the data stream. The modulus P is smaller than the modulus S of the write address counter 5 so that it is ensured that, also for the largest delay to be adjusted, sufficient samples of the data stream are stored in the ring memory 1. The modulo counter 17 has a clock input 18 for the first sampling clock signal CLKM. The count of the modulo counter 17 is supplied at an output 19 and is applied to a count input 20 of a first sample-and-hold circuit 21 for storing the count of the modulo counter 17 when the first synchronizing signal SM occurs, and to a count input 22 of a decoding circuit 23 which detects the basic state of the modulo counter 17. In this basic state the decoding circuit 23 supplies a signal having a high logic level from an output 24, while a signal having a low logic level is present during the other time intervals. Overall, a second sampling clock signal CLKN having the low sampling rate is supplied from the output 24. Together with the decoding circuit 23, the modulo counter 17 serves as a reference for the phase of the low sampling rate data stream, while the modulus P constitutes the sub-sampling factor between the high and the low sampling rate.

Synchronizing pulses in the first synchronizing signal SM, coinciding, for example, with the sample of the information signal component DM, representing the start of a television line when the information signal component DM represents a television signal, store the then current values of the count applied via the count input 20 of the modulo counter in the first sample-and-hold circuit 21. To this end, the first synchronizing signal SM is supplied from the terminal 4 via a sampling signal input 25 of the first sample-and-hold circuit 21. Until the instant when the next pulse of the first synchronizing signal SM occurs, the first sample-and-hold circuit 21 supplies the stored count from an output 26. This count is applied from this output to an input 27 of an allocating circuit 28 which supplies a predeterminable value of the difference address signal from its output 29 at each of the possible counts of the modulo counter 17 and applies this difference address signal denoted by DEL to the second input 15 of the combination circuit 13.

FIG. 2 shows a Table to explain the operation of the allocating circuit 28, by way of example, for the value P=4. It provides a tabular allocation between the count, denoted by PHI of the modulo counter 17 at the count input 20 and the value of the difference address signal DEL. This tabular relationship in FIG. 2 can also be represented by the relation $$DEL = P - PHI + K$$

in which K is an integral constant and was chosen to be 0 in the relevant case.

The embodiment of the circuit arrangement shown in FIG. 1 also includes a second sample-and-hold circuit 30, a first data input 31 of which receives the information signal component DL of the data stream from the first data output 10 and a second data input 32 receives the synchronizing signal SL from the second data output 11 of the ring memory 1. When one of the pulses occurs in the second sampling clock signal CLKN which is applied to a sampling signal input 33 of the second sample-and-hold circuit 30, these signals are stored and supplied, until the occurrence of the next pulse in the second sampling clock signal CLKN, at the data output 34 for the information signal component DN of the low sampling rate data stream and at the data output 35 for the corresponding low sampling rate synchronizing signal SN.

FIG. 3 shows, by way of example, a first mode of operation of the circuit arrangement of FIG. 1 in a mixed tabular and diagrammatic form. In the two upper lines of FIG. 3 above the tabular arrangement, the sampling clock signals CLKM and CLKN for the high and low sampling rates, respectively, are shown with respect to time t. The first sampling clock signal CLKM has four times the frequency of the second sampling clock signal CLKN. Accordingly, the modulus P of the modulo counter 17 is set at the value 4. The first line of the tabular part of FIG. 3 shows the associated value of the count PHI of the modulo counter 17 assuming the values 0, 1, 2 and 3 in a cyclic pattern for the individual periods of the first sampling clock signal CLKM. FIG. 3 shows the case where the data streams DM anti SM at the data inputs 2 and 3, respectively, of the ring memory 1 are in phase with the count PHI, i.e. in phase with the second sampling clock signal CLKN. The synchronizing pulse in the first synchronizing signal SM is accentuated in the corresponding tabular field.

Accordingly, the samples of the information signal component DM of the data stream, which are enumerated as from 1, start and temporally coincide with the pulse in the first synchronizing signal SM in a time interval in which the count PHI of the modulo counter 17 is zero. Therefore, the value 0 is stored for the count PHI in the first sample-and-hold circuit 21 and applied to the allocating circuit 28. The output 29 of this circuit supplies the value 4 for the difference address signal DEL to the combination circuit 13 so that a delay of four periods of the first sampling clock signal CLKM is effected by the ring memory 1. Accordingly, the start of the series of samples of the information signal component DL as well as of the synchronizing signal SL is exactly one period of the second sampling clock signal CLKN later, which is shown in the fourth and fifth lines of the Table in FIG. 3. Due to the simultaneously occurring pulse in the second sampling clock signal CLKN, these values—the first sample of the information signal component DL as well as the synchronizing pulse in the synchronizing signal SL—are stored in the second sample-and-hold circuit 30 by means of which they are supplied as a low sampling rate data stream DN, SN, as can be seen in the last two lines of the Table of FIG. 3.

FIG. 4 shows a further example of a mode of operation of the circuit arrangement of FIG. 1 again showing the same signals in the same sequence and arrangement. However, in the operating mode according to FIG. 4, the data stream DM, SM at the data inputs 2, 3 of the ring memory 1 is not in phase with the count PHI of the modulo counter 17 and consequently is not in phase with the second sampling clock signal CLKN, but the pulse in the first synchronizing signal SM as well as the first sample of the information signal component DM occur when the count PHI has assumed the value 1. Accordingly, the allocating circuit 28 fixes the value 3 for the difference address signal DEL, and in the ring memory 1 the samples are accordingly delayed by only three periods of the first sampling clock signal CLKM. FIG. 4 shows that the data stream DL, SL at the data outputs 10, 11 of the ring memory 1 is again in phase with the pulses in the second sampling clock signal CLKN. Consequently, the same sequence of samples as in the operating mode according to FIG. 3, likewise in phase with the pulses in the second sampling clock signal CLKN, is produced for the low sampling rate data stream DN, SN at the data outputs 34, 35. The circuit arrangement according to FIG. 1 thus provides the possibility of phase matching without asynchronous resetting of the modulo counter so that the risk of disturbing recursive computing runs for the samples of the data stream and hence the risk of affecting, for example, vertical controls or filtering operations is excluded. Thus, a sub-sampling in phase with the first sampling clock signal CLKM is ensured without a phase variation of the second sampling clock signal CLKN being required. In the embodiment described hereinbefore, this will be particularly evident from the delay of the synchronizing signal simultaneously with the information signal component.

I claim:

1. A circuit arrangement for synchronizing successive, low sampling rate samples of a data stream converted from a high sampling rate to the low sampling rate and represented as a sequence of samples of a signal with a first synchronizing signal (SM) contained in the high sampling rate data stream, comprising: a memory cyclically written and read in an equidirectional address sequence and which receives write address signals for writing the samples of the high sampling rate data stream from a write address counter which counts periods of a first sampling clock signal having the high sampling rate, means for supplying read address signals to the memory for reading samples of the equally high sampling rate data stream from a combination circuit in which the read address signals are derived from an additive combination of the write address signals with a difference address signal received from an arrangement for forming the difference address signal, wherein the arrangement for forming the difference address signal comprises a modulo counter for counting the periods of the first sampling clock signal, a first sample-and-hold circuit for storing the count (PHI) of the modulo counter in response to the first synchronizing signal, and an allocating circuit which receives the count (PHI) stored in the first sample-and-hold circuit and supplies the combination circuit with a value of the difference address signal at each of these counts (PHI), at which value the write address counter has a larger modulus (S) than the modulo counter, and the modulus (P) of the modulo counter corresponds to an integral ratio between the high and the low sampling rates, a decoding circuit coupled to the modulo counter for supplying a second sampling clock signal having the low sampling rate whenever the modulo counter assumes a basic state, and a second sample-and-hold circuit for storing a sample which is read from the memory by means of the read address signal and at the instant of occurrence of the second sampling clock signal and for supplying the samples thus stored as the low sampling rate data stream.

2. The circuit arrangement as claimed in claim 1, wherein the samples within the data stream comprise an information signal component and a synchronizing signal component associated with the first synchronizing signal.

3. The circuit arrangement as claimed in claim 1, wherein the data stream comprises a sequence of samples of a television signal.

4. A circuit for converting an input data signal sampled at a high sampling rate into a synchronized output data signal sampled at a low sampling rate with an integral ratio between said sampling rates, said circuit comprising:

a memory which receives the input data signal, a write address counter coupled to the memory and to a clock terminal which supplies a first sampling clock signal at the high sampling rate, a modulo counter coupled to the clock terminal and whose modulus corresponds to the integral ratio of the high and the low sampling rates, a first sample-and-hold circuit coupled to an output of the modulo counter for storing the count of the modulo counter in synchronism with a received first synchronizing signal present in the input data signal, an allocating circuit coupled to an output of the first sample-and-hold circuit so as to derive a difference address signal as a function of the count stored in the first sample-and-hold circuit a combination circuit which receives write address signals from the write address counter and said difference address signal from the allocating circuit and which supplies to the memory a read address signal at the high sampling rate, a second sample-and-hold circuit coupled to an output of the memory, and a decoding circuit coupled between the output of the modulo counter and a clock input of the second sample-and-hold circuit for clocking the second sample-and-hold circuit with a second sampling clock signal at the low sampling rate when the modulo counter assumes a basic state, wherein the second sample-and-hold circuit receives data read from the memory at the high sampling rate and supplies synchronized output data at the low sampling rate.

5. The synchronized converting circuit as claimed in claim 4 wherein the combination circuit has a positive and a negative input which receive the write address signal and the difference address signal, respectively, and additively combines said signals to produce the read address signal, and the write address counter has a larger modulus (S) than the modulus (P) of the modulo counter.

6. The synchronized converting circuit as claimed in claim 4 wherein the memory includes a clock input coupled to said clock terminal, said memory being simultaneously written into and read from at said high sampling rate.

7. The synchronized converting circuit as claimed in claim 4 wherein said decoding circuit only supplies a clock signal to the second sample-and-hold circuit each time the modulo counter reaches said basic state whereby the frequency of the second clock signal differs from that of the first clock signal by a factor equal to the modulus of the modulo counter.

8. The synchronized converting circuit as claimed in claim 4 wherein the memory has an input coupled to an input terminal which supplies said first synchronizing signal which is present in the input data signal, said input terminal being coupled to the first sample-and-hold circuit to synchronize same to said first synchronizing signal.

* * * * *